United States Patent
Takeda (10) Patent No.: US 10,095,921 B2
(45) Date of Patent: Oct. 9, 2018

(54) PROCESSING DEVICE AND PROCESSING METHOD

(71) Applicant: FUJI XEROX CO., LTD., Tokyo (JP)

(72) Inventor: Junichi Takeda, Yokohama (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 420 days.

(21) Appl. No.: 14/803,537

(22) Filed: Jul. 20, 2015

(65) Prior Publication Data

US 2016/0283177 A1 Sep. 29, 2016

(30) Foreign Application Priority Data

Mar. 24, 2015 (JP) .................. 2015-061194

(51) Int. Cl.
*G06K 9/00* (2006.01)
*G06K 9/62* (2006.01)

(52) U.S. Cl.
CPC ....... *G06K 9/00449* (2013.01); *G06K 9/6215* (2013.01); *G06K 9/6255* (2013.01); *G06K 9/6284* (2013.01)

(58) Field of Classification Search
CPC .................. G06K 9/00442–9/00483
See application file for complete search history.

(56) References Cited

U.S. PATENT DOCUMENTS

| | | | | |
|---|---|---|---|---|
| 5,815,704 A | * | 9/1998 | Shimotsuji | G06F 17/2205 358/403 |
| 2011/0135162 A1 | * | 6/2011 | Eguchi | G06K 9/00449 382/112 |
| 2011/0243459 A1 | * | 10/2011 | Deng | G06K 9/6203 382/218 |
| 2013/0230256 A1 | * | 9/2013 | Deng | G06K 9/6203 382/218 |
| 2015/0278620 A1 | * | 10/2015 | Fujita | H04N 19/44 382/182 |

FOREIGN PATENT DOCUMENTS

JP 2013-77291 A 4/2013

\* cited by examiner

*Primary Examiner* — Sean Motsinger
(74) *Attorney, Agent, or Firm* — Sughrue Mion, PLLC (57) ABSTRACT

A processing device includes: a memory that stores first difference information representing a difference between a judgment use frame in reference information and a representative frame in association with the reference information; and a judging unit that, based on second difference information representing a difference between a judgment frame in input information and the representative frame and on the first difference information stored in the memory, judges the input information by use of the reference information.

14 Claims, 12 Drawing Sheets

PROCESSING DEVICE AND PROCESSING METHOD

CROSS REFERENCE TO RELATED APPLICATION

This application is based on and claims priority under 35 USC § 119 from Japanese Patent Application No. 2015-061194 filed Mar. 24, 2015.

BACKGROUND

Technical Field

The present invention relates to a processing device and a processing method.

Related Art

There are known a lot of techniques for identifying various kinds of forms from one another.

SUMMARY

According to an aspect of the present invention, there is provided a processing device including: a memory that stores first difference information representing a difference between a judgment use frame in reference information and a representative frame in association with the reference information; and a judging unit that, based on second difference information representing a difference between a judgment frame in input information and the representative frame and the first difference information stored in the memory, judges the input information by use of the reference information.

BRIEF DESCRIPTION OF THE DRAWINGS

An exemplary embodiment of the present invention will be described in detail based on the following figures, wherein.

DETAILED DESCRIPTION

Hereinafter, an exemplary embodiment according to the present invention will be described in detail with reference to attached drawings.

[Overall Configuration of Image Processing System 100]

Figure 1:
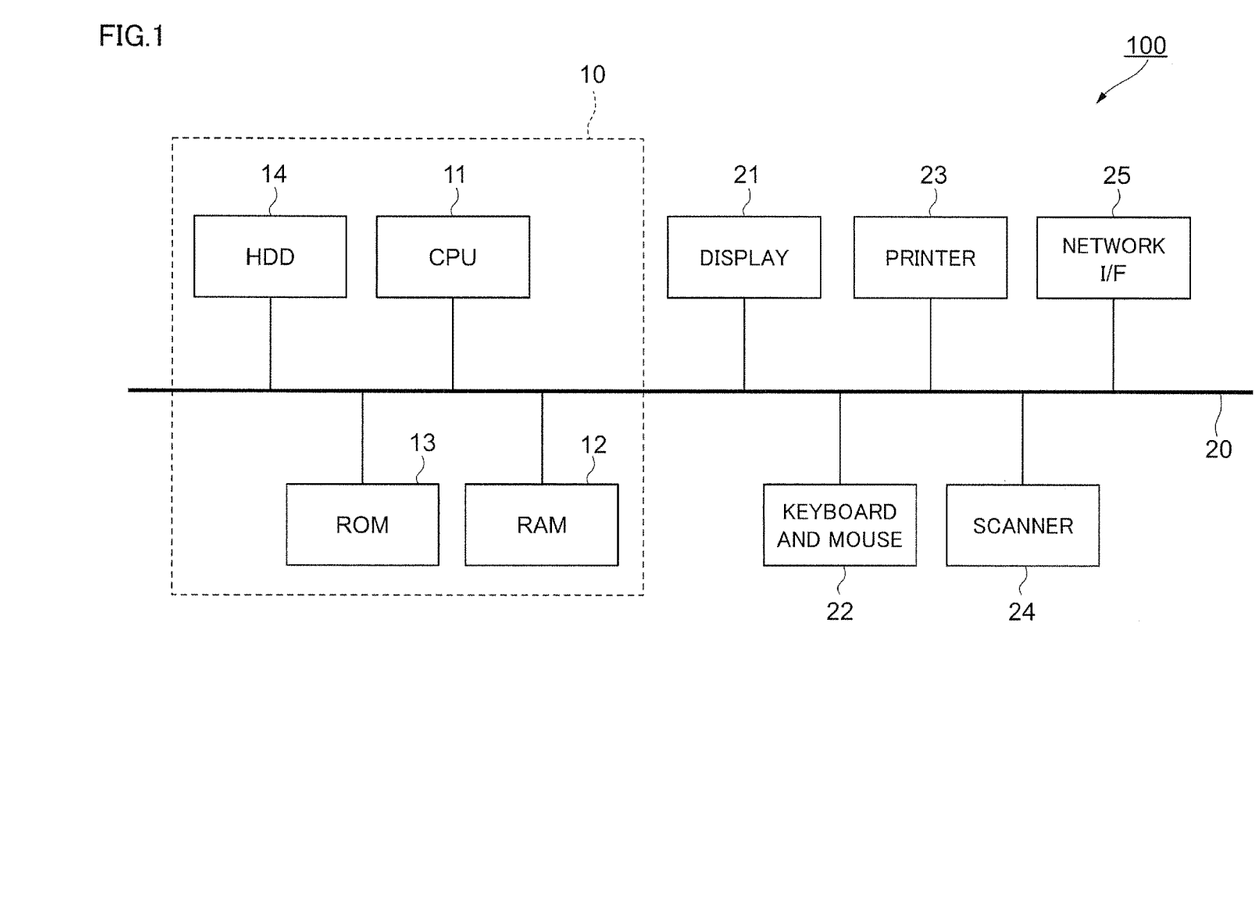
FIG. 1 is a schematic view showing an overall configuration of an image processing system to which the exemplary embodiment is applied.

FIG. 1 is a schematic view showing an overall configuration of an image processing system 100 to which the exemplary embodiment is applied. The image processing system 100 includes a form processing device 10, which is one of processing devices, and various kinds of appliances are connected to the form processing device 10 via a network 20. As the various kinds of appliances, there are provided: a display 21, which is an output unit such as a liquid crystal display; a keyboard and a mouse 22, as an operation and input unit of a user; a printer 23 as an image forming device that records an image on a sheet by a recording system, such as an electrophotographic system; a scanner 24 as a reading unit or an image reading device that obtains a scanned image added with, for example, an automatic document feeder; and a network interface 25 that carries out transmission and reception of various items of information with external appliances.

The form processing device 10 is configured with, for example, a personal computer (PC), and includes various functions which a general PC includes. In some cases, for example, the form processing device 10 is integrated with the printer 23 or the scanner 24 to be built into an image forming apparatus (an example of the image processing system), which is called a multifunction machine. The form processing device 10 includes a CPU 11 that implements various kinds of software, such as an OS (Operating System) or applications, to thereby carry out various functions, which will be described later, a RAM 12 used as a working memory of the CPU 11, and a ROM 13 that is a memory for storing various kinds of programs to be executed by the CPU 11. The RAM 12 can also function as a primary storage region for form images, various kinds of information in the middle of a process, or the like. The form processing device 10 further includes a hard disk drive (HDD) 14 as a storage device (a memory) that stores the form images, transformation information, which will be described later, or the like.

[Description of Functions of Form Processing Device 10]

Figure 2:
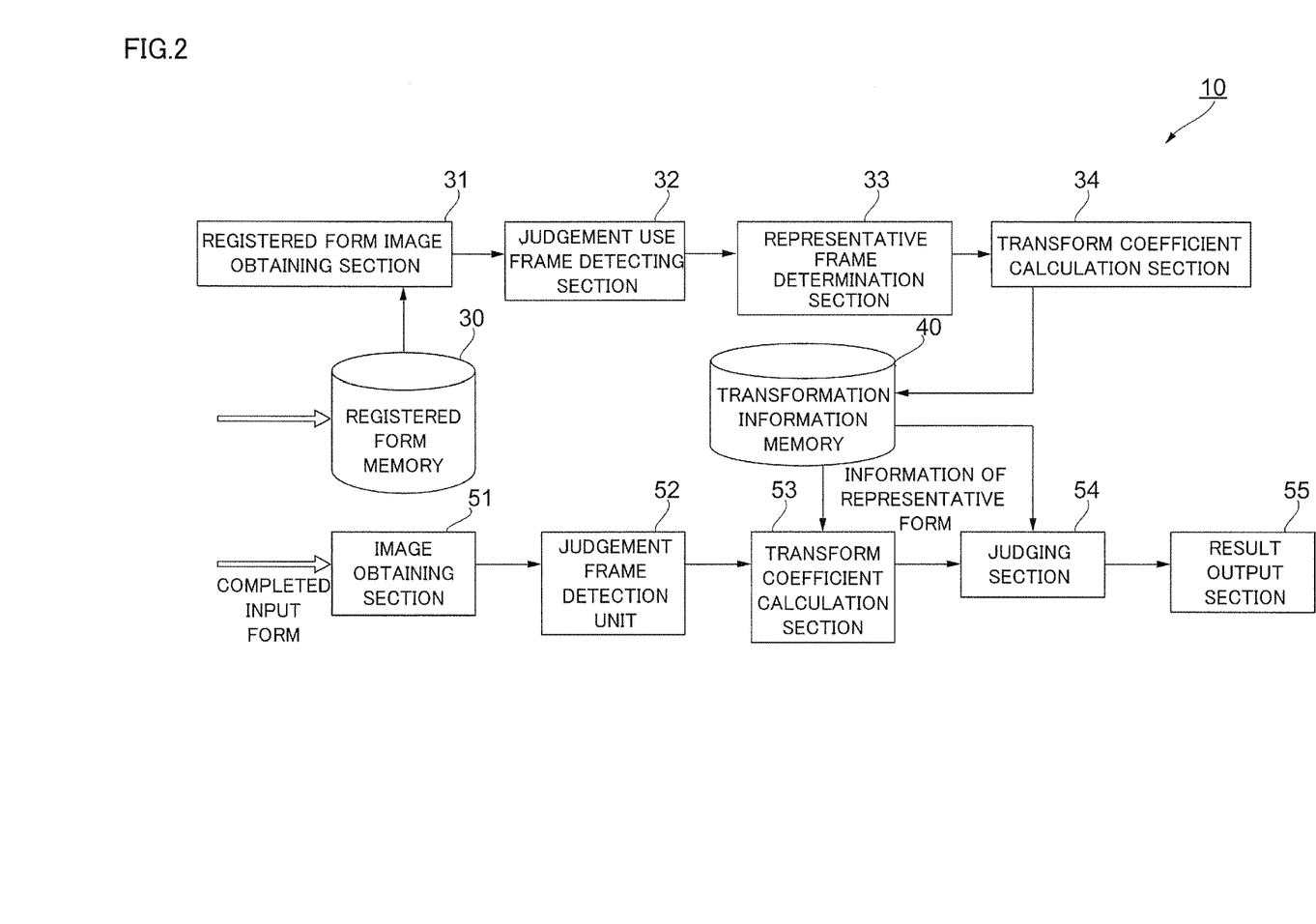
FIG. 2 is a block diagram showing a functional configuration of a form processing device.

FIG. 2 is a block diagram showing a functional configuration of the form processing device 10. The form processing device 10 to which the exemplary embodiment is applied has roughly two lines of processing. Specifically, the two lines of processing are: a registration process that registers transformation information of a registered form for later judgment; and a judging process that judges a form with respect to a completed input form.

The form processing device 10 shown in FIG. 2 includes, as the function of the registration process: a registered form memory 30 that is a database (DB) functioning as one of memories of plural forms; a registered form image obtaining section 31 that functions as one of obtaining units of plural registered forms; a judgment use frame detecting section 32 that functions as one of detecting units for detecting the judgment use frame; a representative frame determination section 33 that functions as one of determination units for determining the representative frame; a transform coefficient calculation section 34 that functions as one of calculation units for calculating first difference information representing a difference between the judgment use frame and the representative frame; and a transformation information memory 40 that is a database (DB) functioning as one of memories storing the first difference information in association with reference information. The transformation information memory 40 also stores information of the representative frame. The registered form memory 30 and the transformation information memory 40 can be configured with the HDD 14 shown in FIG. 1; however, it is also possible to configure the registered form memory 30 and the transformation information memory 40 with other storage devices via the network 20.

Moreover, the form processing device 10 shown in FIG. 2 includes, as the function of the judging process: an image obtaining section 51, which functions as one of obtaining units that obtain the completed input form (the input information) for judgment from, for example, the scanner 24 or the like; a judgment frame detection unit 52, which functions as one of detection units that detect the judgment frame from the obtained input form; a transform coefficient calculation section 53, which functions as one of calculation units that calculate input form difference information (second difference information) that is difference information between the detected judgment frame and the representative frame stored in the transformation information memory 40 in advance; a judging section 54, which functions as one of judging units that compare the input form difference information and the first difference information stored in the transformation information memory 40, to thereby judge (specify) the input form; and a result output section 55 that outputs the judgment result from the judging section 54 to a subsequent process. The judging section 54 also functions as one of difference information obtaining units.

[Description of Registration Process]

First, description will be given of the registration process carried out in the form processing device 10. Note that a form used for the registration process is referred to as "registered form", and a frame used for the registration process is referred to as "judgment use frame".

Figure 3:
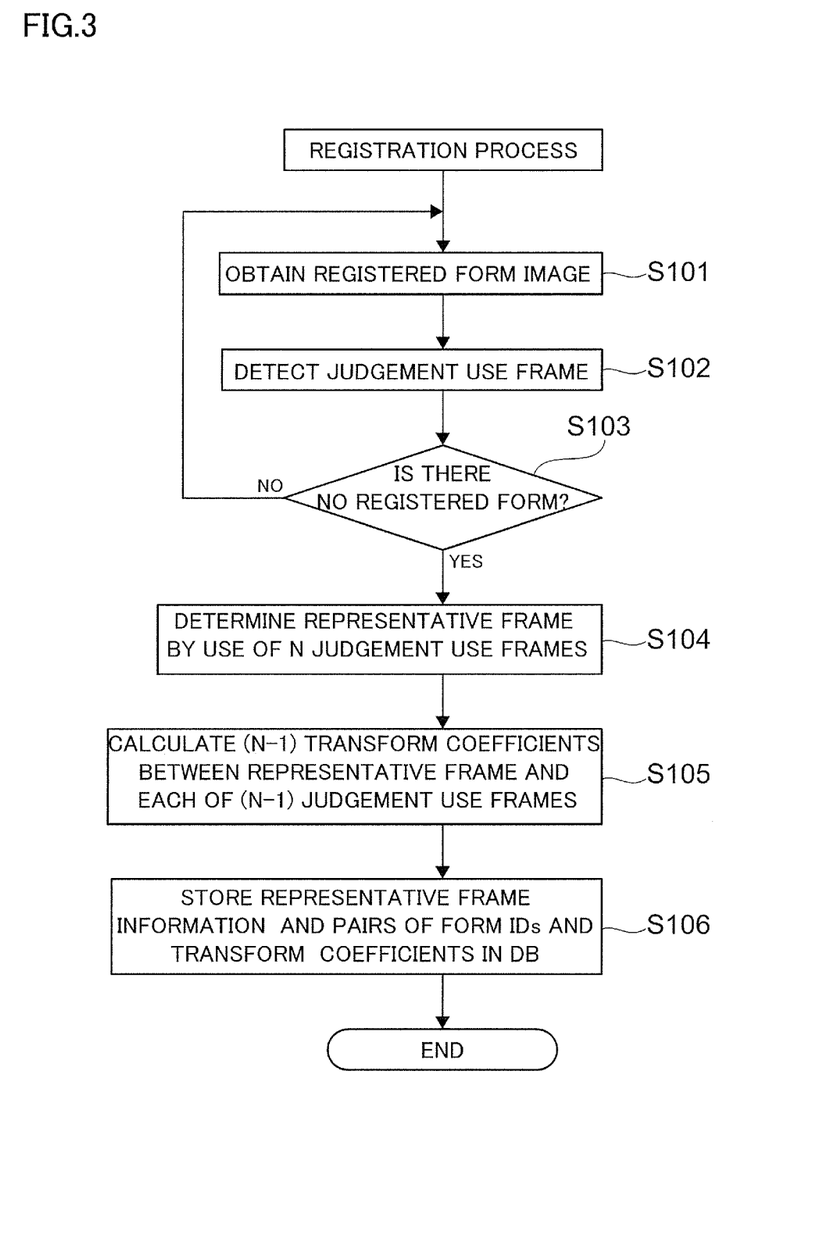
FIG. 3 is a flowchart showing a flow of a registration process.

FIG. 3 is a flowchart showing a flow of the registration process. First of all, the registered form image obtaining section 31 obtains a registered form image from the registered form memory 30 (step 101). Then, the judgment use frame detection section 32 detects the judgment use frame from the obtained registered form image (step 102), and determines whether or not any registered form, on which detection of the judgment use frame has not yet been carried out, is left in the registered form memory 30 (step 103). If there is any registered form left (No in step 103), the process returns to step 101 to obtain the registered form image, and then the detection process of the judgment use frame is carried out. On the other hand, in a case where there is no registered form, on which the detection of the judgment use frame has not yet been carried out, left in the registered form memory 30 (Yes in step 103), the representative frame determination section 33 determines the representative frame by use of N judgment use frames having been detected (N is a general formula) (step 104). Thereafter, the transform coefficient calculation section 34 calculates (N−1) transform coefficients between the determined representative frame and each of the (N−1) judgment use frames (step 105). Then, the transform coefficient calculation section 34 stores representative frame information and (N−1) pairs of form IDs, which are the identifying information, and the transform coefficients in the transformation information memory 40 (DB) (step 106), and thereby the process is finished.

Figure 4:
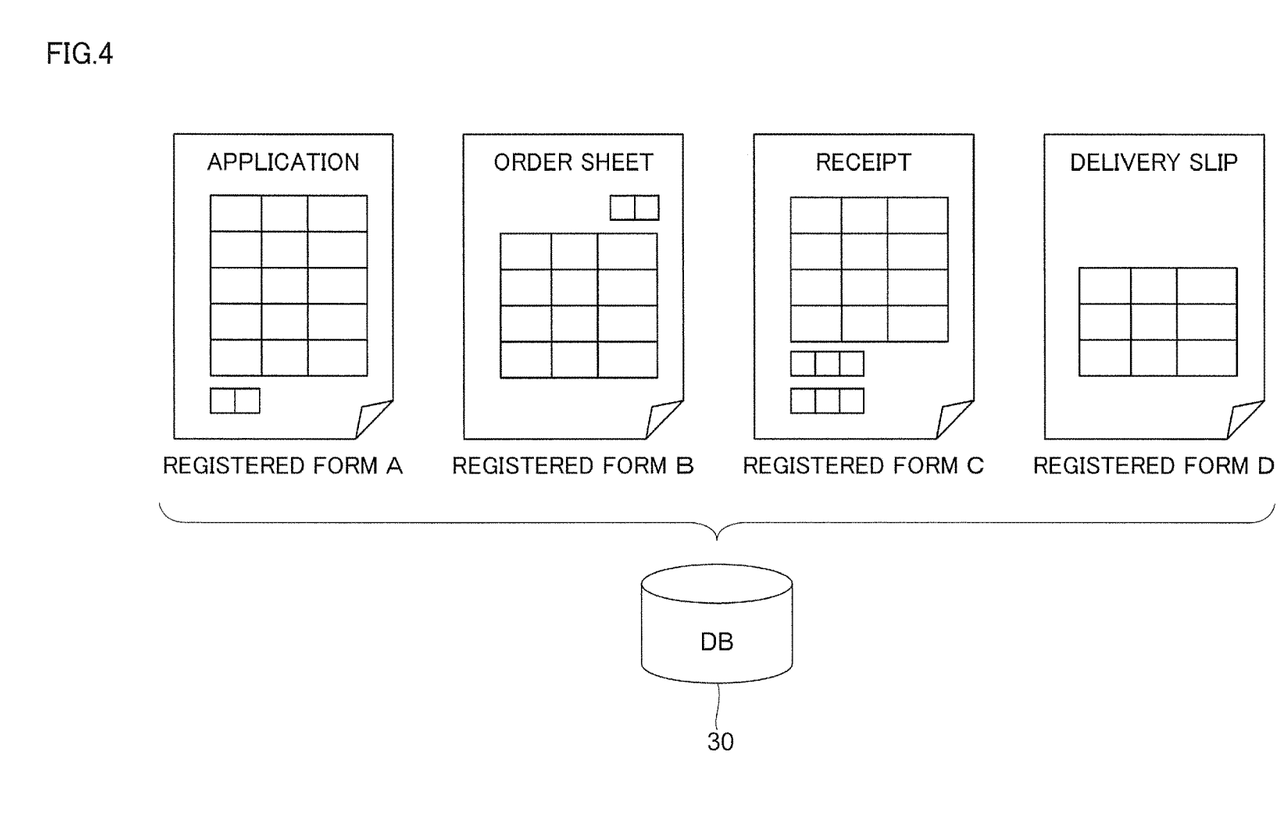
FIG. 4 is a diagram for illustrating plural registered forms obtained from a registered form memory in step 101 of FIG. 3.

FIG. 4 is a diagram for illustrating the plural registered forms, which the registered form image obtaining section 31 obtains from the registered form memory 30, in step 101 of FIG. 3. Here, each of a registered form A, which is a form of an application, a registered form B, which is a form of an order sheet, a registered form C, which is a form of a receipt, and a registered form D, which is a form of a delivery slip, is registered as reference information in the registered form memory 30. In each of these registered forms, some frames are formed. These frames are input frames, in which characters, such as written characters, are inputted. The registered form image obtaining section 31 obtains the images of these registered forms from the registered form memory 30 (DB).

Figure 5:
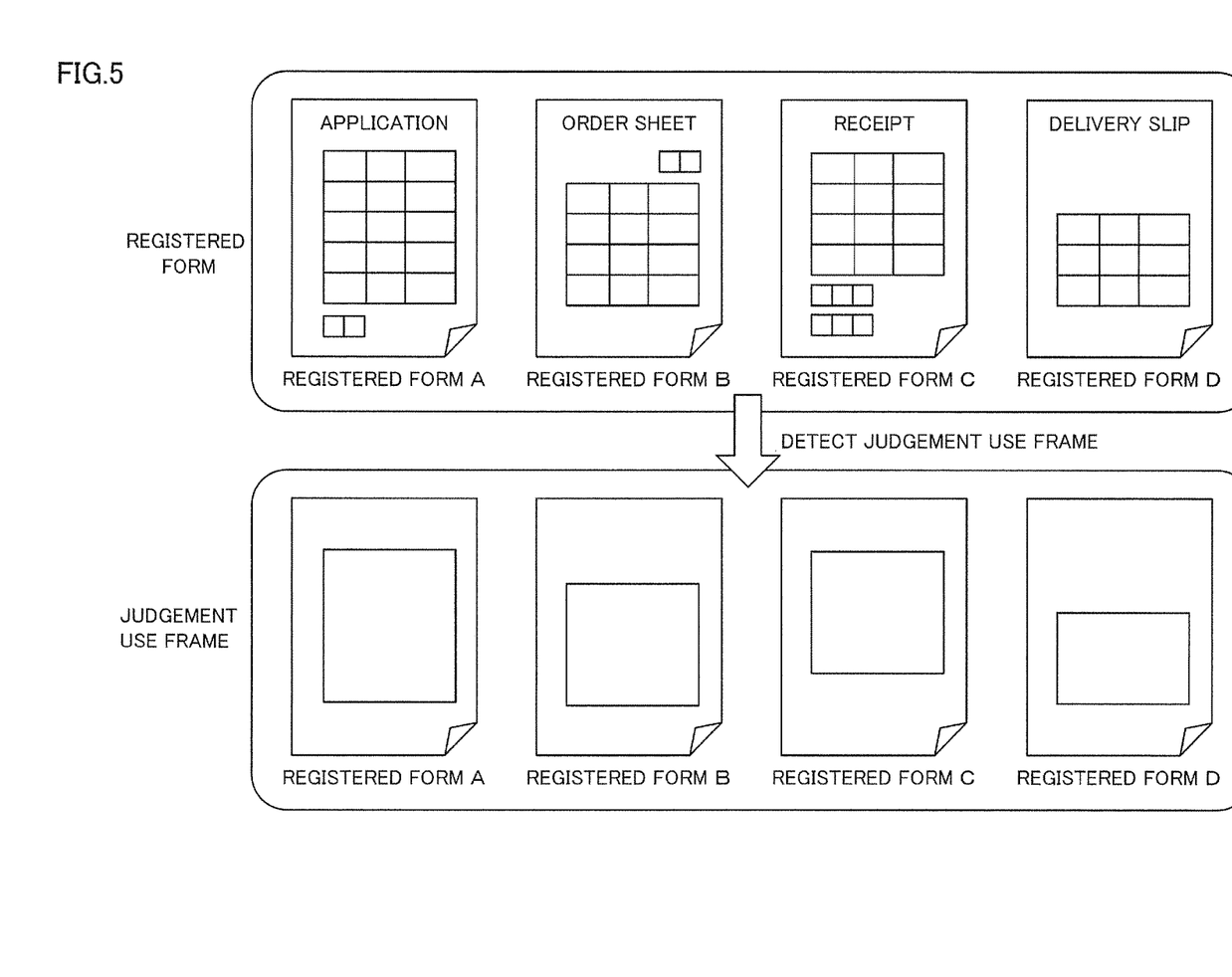
FIG. 5 is a diagram for illustrating a process of detecting judgment use frames from the obtained plural registered forms in step 102 of FIG. 3.

FIG. 5 is a diagram for illustrating a process of the judgment use frame detection section 32 that detects the judgment use frames from the obtained plural registered forms (the registered forms A to D) in step 102 of FIG. 3.

In the judgment use frame detection section 32, one most suitable frame for judgment is detected from each of the plural registered forms (the registered forms A to D). As the most suitable frame for judgment, for example, the largest one or the one closer to a square may be detected. In a lower row of FIG. 5, the largest frame is detected as the judgment use frame from each of the registered forms A to D. For example, the larger the image information used for calculation of a projection transform coefficient, which will be described later, with respect to the entire image, the more stable the calculation and the more improved the accuracy; accordingly, the largest frame is detected here.

Note that, in a case where there are some registered forms including the judgment use frames having substantially the same size and position, it is possible to detect the judgment use frame step by step from those registered frames, such as a second judgment use frame, a third judgment use frame, and the like. By use of the second judgment use frame or the third judgment use frame, judgment can be carried out though there are some registered forms including the judgment use frames having substantially the same size and position.

Figure 6:
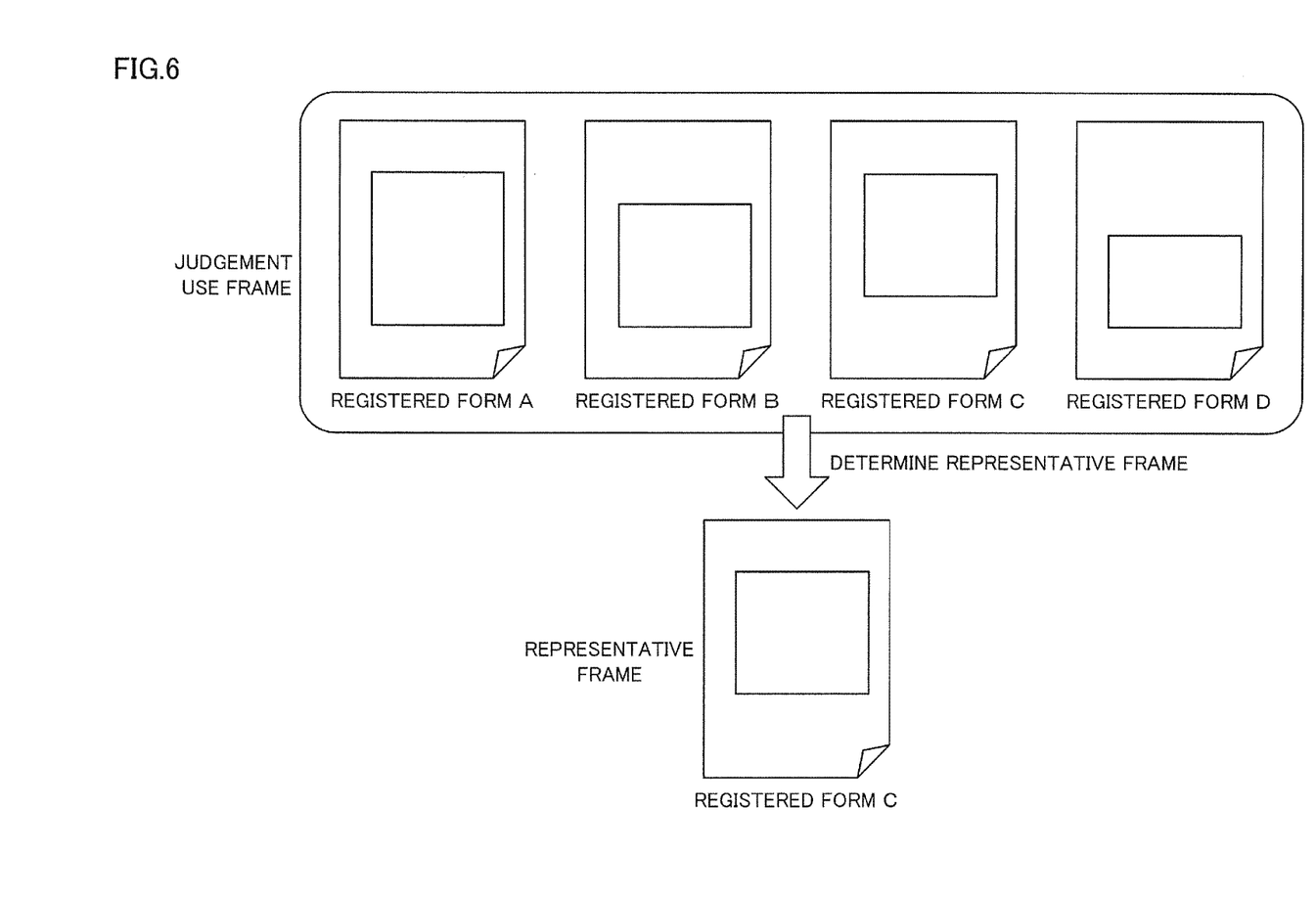
FIG. 6 is a diagram for illustrating a determination process of a representative frame in step 104 of FIG. 3.

FIG. 6 is a diagram for illustrating a determination process of the representative frame carried out in the representative frame determination section 33 in step 104 of FIG. 3. In the example shown in FIG. 6, the representative frame determination section 33 determines the judgment use frame of the registered form C as the representative frame from among the judgment use frames of the respective plural registered forms (registered forms A to D). As a characteristic amount for calculating relative positional relation between the registered forms, one representative frame used for judgment is determined from the judgment use frames that have been detected. Here, for reducing the projection transform coefficient from the representative frame to the judgment use frame, namely, for reducing transformation error, to improve the accuracy, for example, a mid-sized one is determined as the representative frame from the judgment use frames. Moreover, in the following description, the registered form including the representative frame is referred to as "representative form" in some cases.

Note that it is possible to detect all of the frames in the registered form in descending order according to the size as the judgment use frames by the judgment use frame detection section 32, and select the representative frame per each descending frame size in the representative frame determination section 33. In such a case, the transform coefficient calculation section 34 is configured to calculate an affine transformation (or projection transformation) coefficient from the representative frame to the judgment use frame per each frame size, to be stored in the transformation information memory 40.

Moreover, it is possible to select a virtual frame that does not actually exist in the judgment use frames as the representative frame. For example, it may be possible to create a frame having a size and position that are the average size and position of the judgment use frames held by the registered forms A to D, and to determine the created frame as the representative frame.

Figure 7:
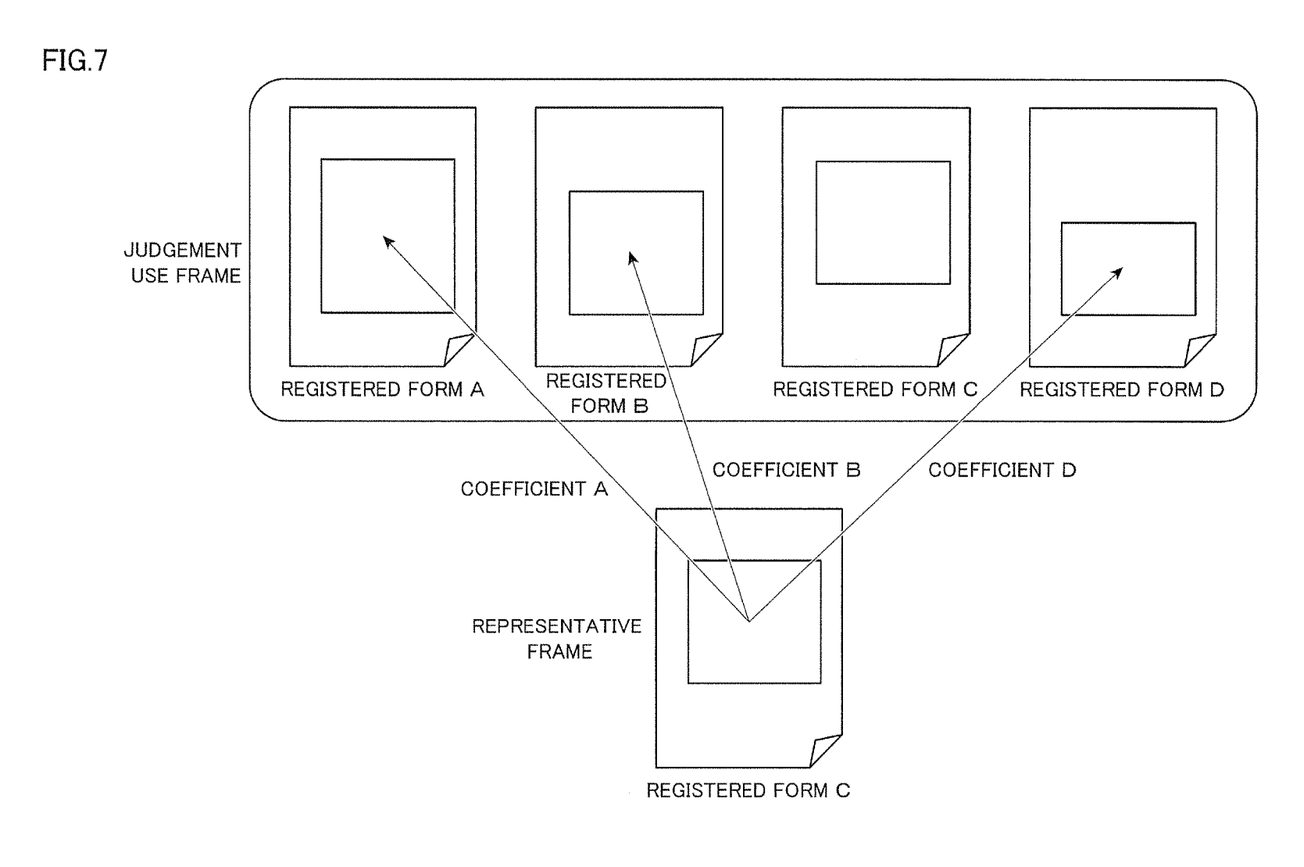
FIG. 7 is a diagram for illustrating a calculation process of a transform coefficient in step 105 of FIG. 3.

FIG. 7 is a diagram for illustrating the calculation process of the transform coefficient carried out by the transform coefficient calculation section 34 in step 105 of FIG. 3. Here, the frame of the registered form C is determined as the representative frame, and the transform coefficient (the coefficients A, B and D) from the representative frame to each of three registered forms A, B and D of the plural registered forms A to D, except the registered form C (representative form) is calculated. Then, each of the calculated transform coefficients is stored in the transformation information memory 40 in association with each of the registered forms. The transform coefficient calculated here is a transform coefficient of coordinate transformation, such as a transform coefficient of affine transformation or a transform coefficient of projection transformation. As to each of the frames of the registered forms A, B and D that have not been determined as the representative frame, the transform coefficient from the representative frame is calculated based on the frame size and position.

The affine transformation performs transformation such as scaling, rotating and moving, and a publicly-known method that is commonly used can be adopted. Though detailed description thereof is omitted, the transformation equation is as described below.

$$u = a \times x + c \times y + t_x$$

$$v = b \times x + d \times y + t_y \qquad \text{[Expression 1]}$$

Here, x and y are coordinates before transformation, and u and v are coordinates after transformation. Moreover, a, b, c, d, $t_x$ and $t_y$ are transform coefficients of the affine transformation. The transform coefficient of the affine transformation with respect to each judgment use frame of each registered form from the representative frame is associated with identifying information of each registered form, to be stored in the transformation information memory 40.

Moreover, as an example of other coordinate transformation, the projection transformation may be adopted. The projection transformation performs, in addition to scaling, rotating and moving, transformation such as shearing, expansion and contraction, and a publicly-known method that is commonly used can be adopted. Though detailed description thereof is omitted, the transformation equation is as described below.

$$u = \frac{a \times x + b \times y + c}{g \times x + h \times y + 1} \qquad \text{[Expression 2]}$$

$$v = \frac{d \times x + e \times y + f}{g \times x + h \times y + 1}$$

Here, x and y are coordinates before transformation, and u and v are coordinates after transformation. Moreover, a, b, c, d, e, f, g and h are transform coefficients of the projection transformation. The transform coefficient of the projection transformation from the representative frame to each judgment use frame of each registered form is associated with identifying information of each registered form (the registered form ID), to be stored in the transformation information memory 40.

[Description of Judging Process]

Next, description will be given of the judging process carried out in the form processing device 10. Note that, for distinguishing from "registered form" used in the registration process, here, the form to be judged is referred to as "input form". Moreover, for distinguishing from "judgment use frame" used in the registration process, the frame in the input form is referred to as "judgment frame".

Figure 8:
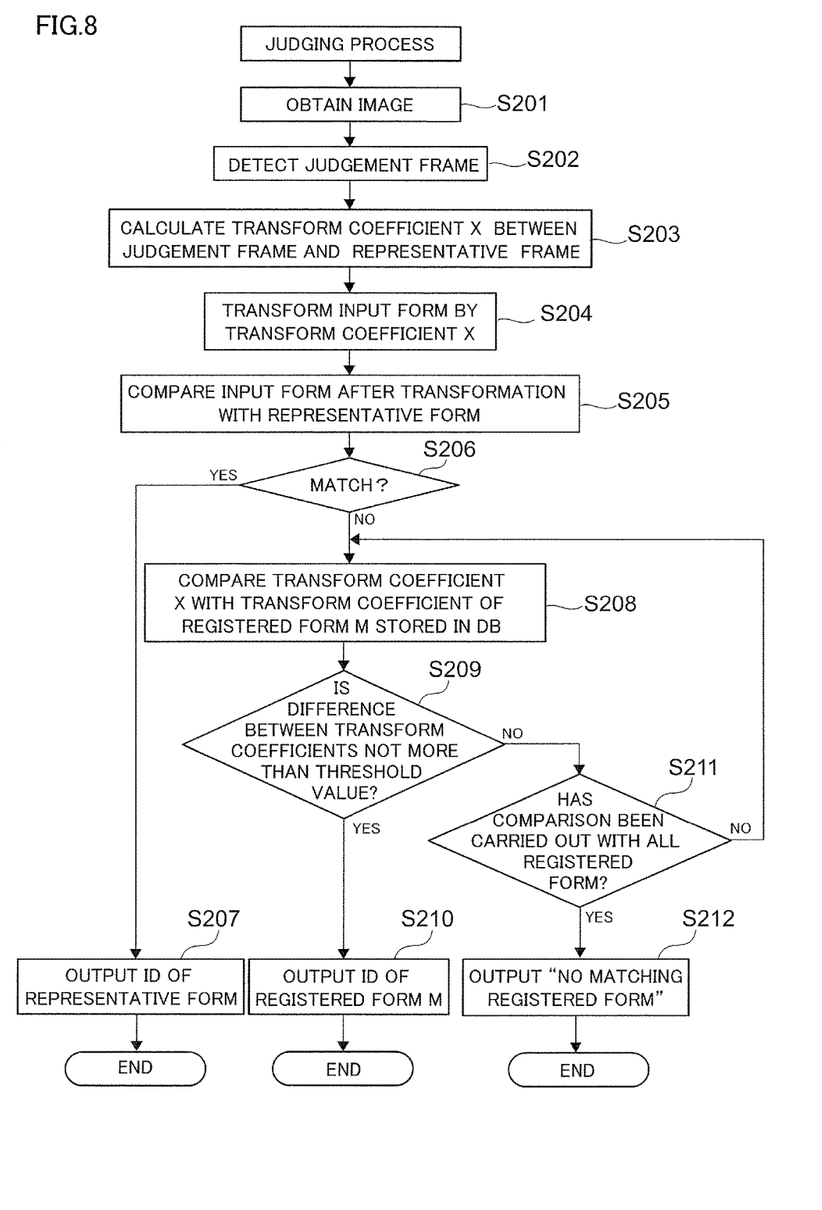
FIG. 8 is a flowchart showing a flow of a judging process.

FIG. 8 is a flowchart showing a flow of the judging process.

First of all, the image obtaining section 51 obtains an image of a completed input form (step 201). Next, the judgment frame detection section 52 detects a judgment frame of the input form (step 202). Then, the transform coefficient calculation section 53 calculates the transform coefficient X (the coefficient X) between the judgment frame of the input form and the representative frame stored in the transformation information memory 40 (step 203). Here, the judging section 54 transforms the input form by the transform coefficient X (the coefficient X) between the judgment frame and the representative frame (step 204). Then, comparison between the input form after transformation and the representative form is carried out (step 205). According to this comparison, if the forms match each other (Yes in step 206), the result output section 55 outputs identifying information (ID) of the representative form (step 207), and the judging process is finished.

According to the comparison in step 205, if there is no match between the forms (No in step 206), the judging section 54 compares the calculated transform coefficient X (the coefficient X) with a transform coefficient of a predetermined registered form M stored in the transformation information memory 40 (step 208). The numerical value "M" is adopted as a general formula representing each of plural registered forms. Here, since, for example, the frame and the position of the frame are determined by the coefficient of the affine transformation, it is possible to determine whether there is a match between the forms based on a difference between the transform coefficients. Therefore, according to the comparison in step 208, it is determined whether or not the difference between the transform coefficients is not more than a threshold value (step 209). The threshold value is a difference acceptable as the same one, which is obtained experimentally and is determined in advance. In a case where the difference between the transform coefficients is not more than the threshold value (Yes in step 209), the result output section 55 outputs identifying information (ID) of the registered form M (step 210), and the judging process is finished. In a case where the difference between the transform coefficients is more than the threshold value (No in step 209), it is determined whether the comparison has been carried out with all of the registered forms (step 211), and in a case where the comparison has been carried out with all of the registered forms (Yes in step 211), the result output section 55 outputs "No matching registered form" (step 212), and the judging process is finished. In a case where the comparison with all of the registered forms has not yet been finished (No in step 211), the process returns to step 208 to carry out the comparison process.

Figure 9:
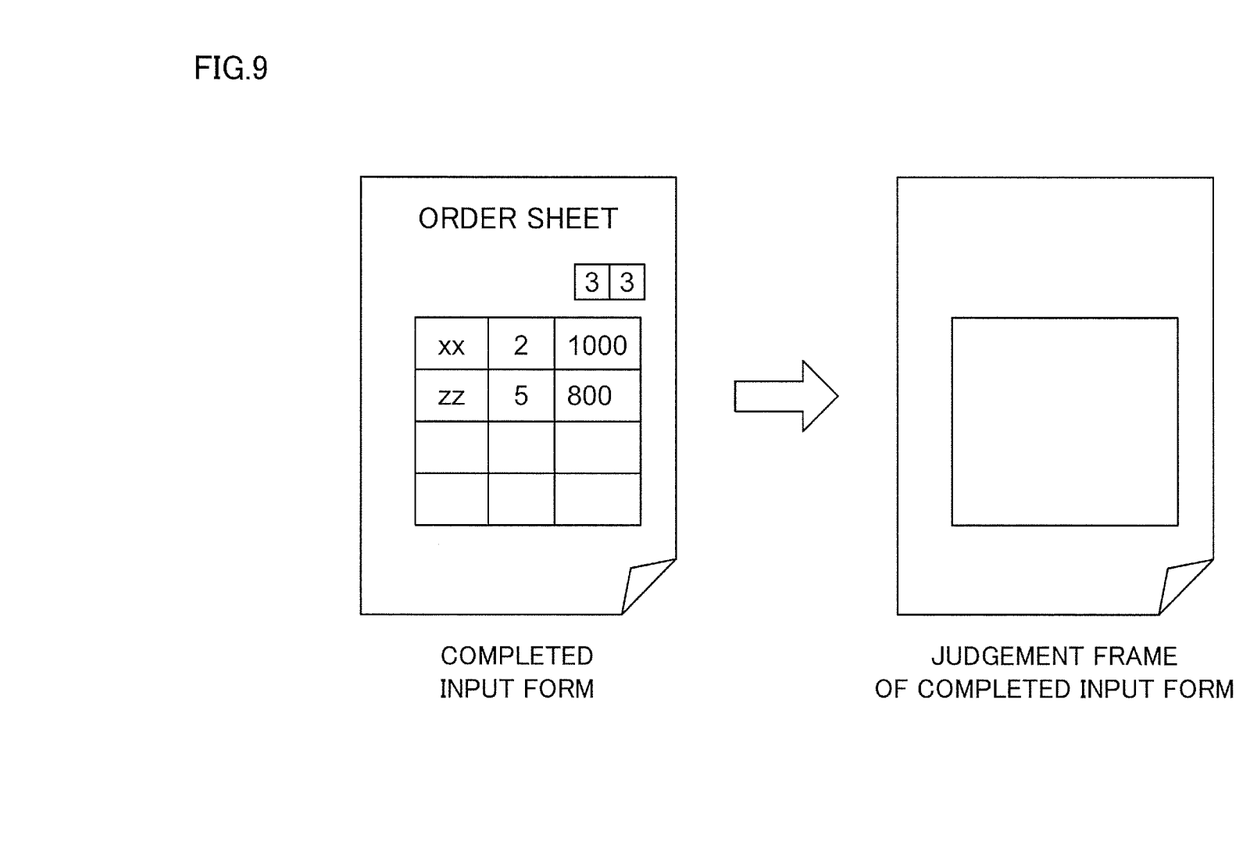
FIG. 9 is a diagram for illustrating a process of detecting a judgment frame of a completed input form from the obtained completed input form in step 202 of FIG. 8.

FIG. 9 is a diagram for illustrating a process of the judgment frame detection section 52 that detects a judgment frame of a completed input form from a completed input form, which has been obtained by the image obtaining section 51, in step 202 of FIG. 8. The image obtaining section 51 obtains the completed input form read by, for example, the scanner 24 (refer to FIG. 1) via the network 20 (refer to FIG. 1). On the left side of FIG. 9, an order sheet is shown as an example of the completed input form, and some symbols or numerical values are written on the order sheet. The judgment frame detection section 52 detects the judgment frame from the obtained completed input form. On the right side of FIG. 9, a judgment frame of the completed input form is shown. Here, one judgment frame used for judgment is detected from the completed input form. It is assumed that detection of the judgment frame is carried out under the same conditions as the detection of the judgment use frame carried out in the judgment use frame detection section 32. For example, the largest one or the one closer to a square is detected.

Figure 10:
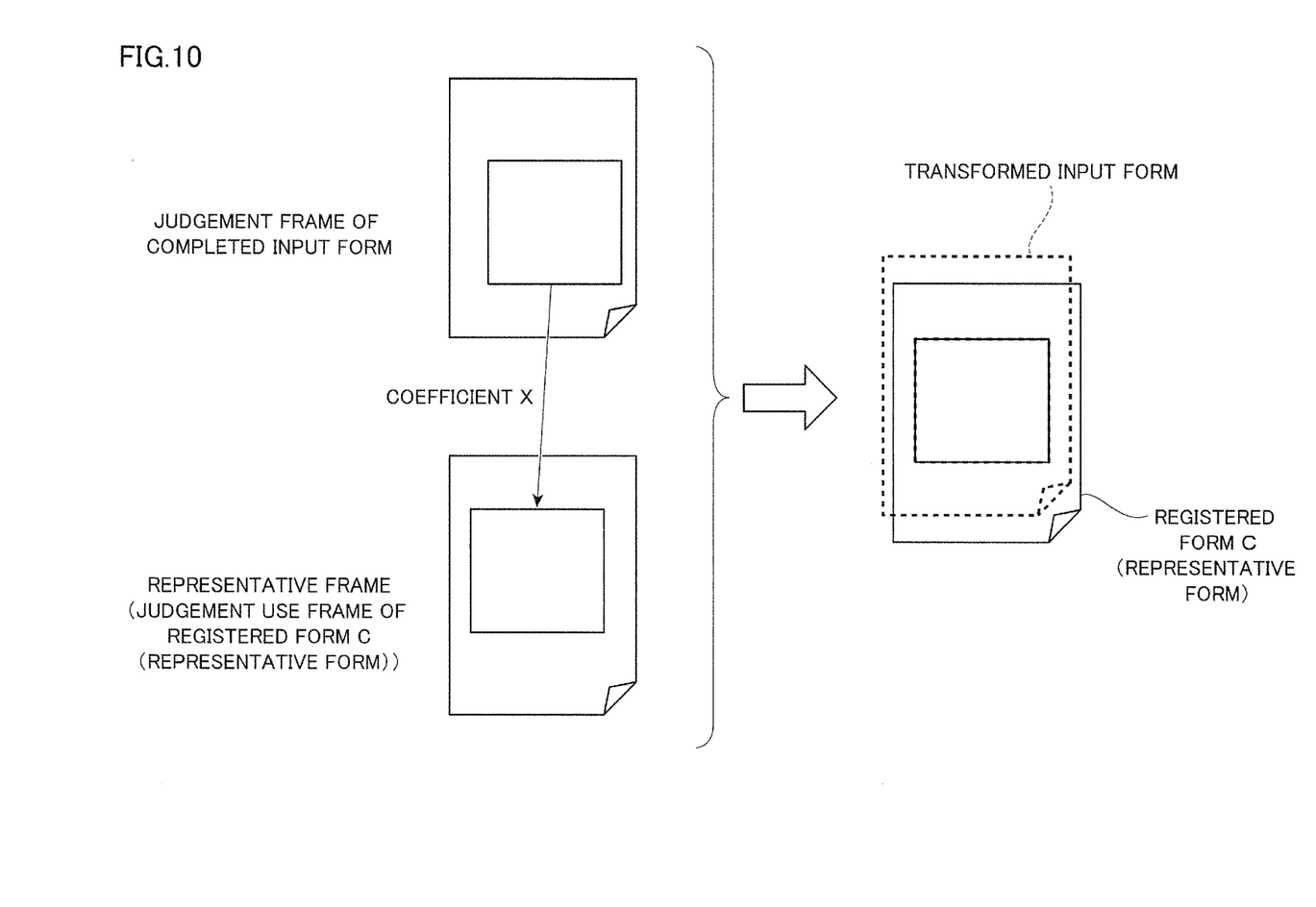
FIG. 10 is a diagram for illustrating a calculation process of a transform coefficient between the judgment frame and the representative frame in step 203 and a judging process of the representative frame with respect to a representative form carried out in steps 204 and 205 in FIG. 8.

FIG. 10 is a diagram for illustrating a calculation process of the transform coefficient between the judgment frame and the representative frame carried out by the transform coefficient calculation section 53 in step 203, and a judging process of the representative frame with respect to the registered form (the representative form) carried out in steps 204 and 205 in FIG. 8. Here, in the illustration on the left side of FIG. 10, the transform coefficient calculation section 53 calculates the input form difference information (the second difference information), which is the difference information between the judgment frame of the completed input form detected by the judgment frame detection section 52 and the representative frame stored in the transformation information memory 40. Here, as the difference information, the coefficient X of the coordinate transformation (for example, the affine transformation or projection transformation) with the representative frame, which is the same as the representative frame used in the registration process (the judgment use frame of the registered form C), is calculated.

Then, as shown in the illustration on the right side of FIG. 10, the judging section 54 transforms the completed input form by use of the calculated coefficient X, to thereby obtain a transformed input form (the form indicated by broken lines in the figure), which is an input form after transformation. Then, it is determined whether or not the transformed input form and the registered form C including the representative frame (the representative form) match each other. As shown in the illustration on the right side of FIG. 10, in this example, there is a difference in the position of the image between the judgment frame of the transformed input form and the representative frame of the registered form C (the representative form). Accordingly, it is judged that the transformed input form and the registered form C including the representative frame (the representative form) do not match each other.

Next, in a case where it is not judged that the completed input form and the registered form C including the representative frame (the representative form) match each other, the processes in steps 208 and 209 in FIG. 8 are carried out, that is, the judging section 54 compares the coefficient X calculated in the transform coefficient calculation section 53 with the transform coefficient (the coefficients A, B and D) of each of the plural registered forms stored in the transformation information memory 40, and judges the one having the smallest difference as a matching form.

Note that information about occurrence frequency of a registered form is grasped in advance, and, for example, the information about occurrence frequency is stored in the transformation information memory 40 or the like. It is possible to configure the judging section 54 such that, when the coefficient X is compared with the transform coefficient (the coefficients A, B and D) of each of the plural registered forms stored in the transformation information memory 40, the registered forms are judged in descending order according to the occurrence frequency by use of the information. In this case, the judging speed of a form of high occurrence frequency is increased.

Next, another example of the judging process will be described.

Figure 11:
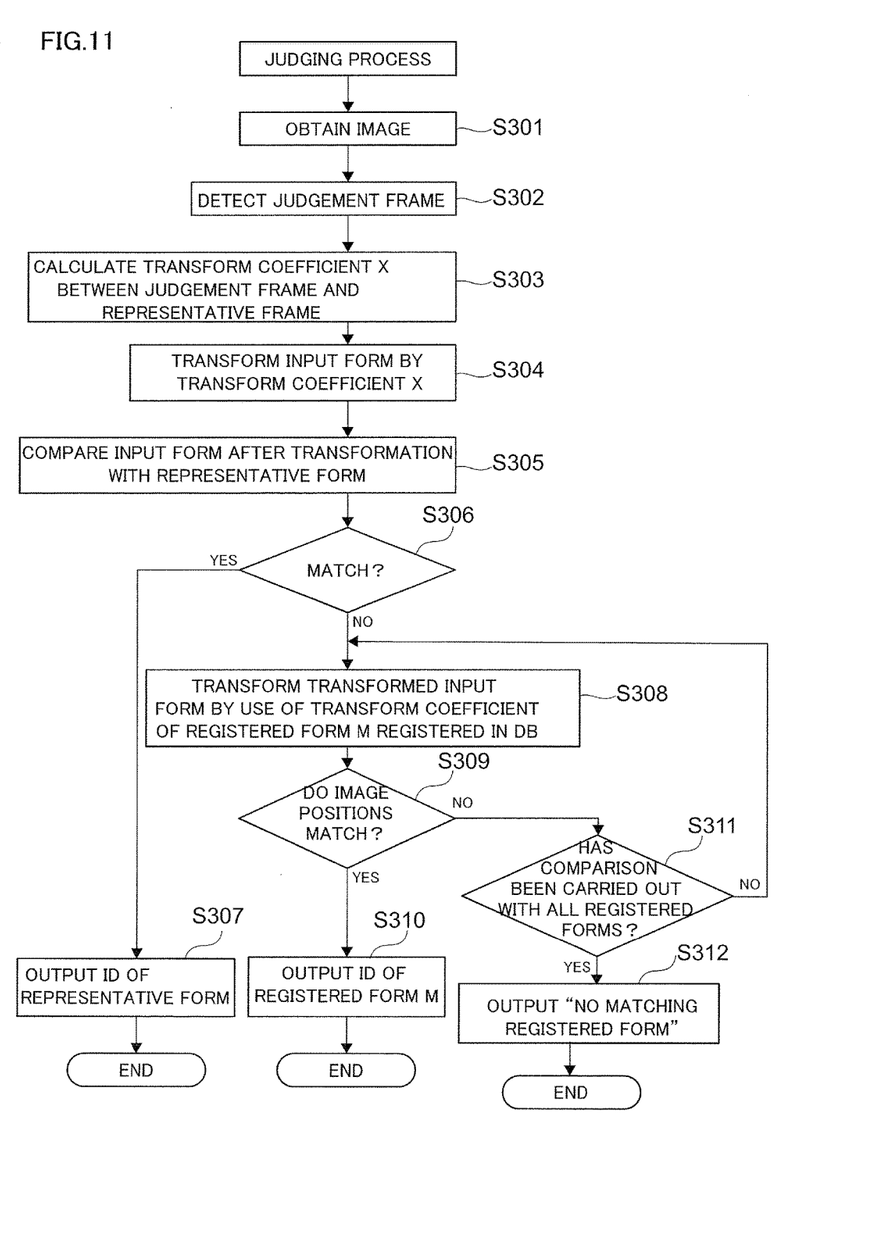
FIG. 11 is a flowchart showing a flow of another judging process.

FIG. 11 is a flowchart showing a flow of another judging process.

Here, for increasing the judging accuracy, the input form after transformation (the transformed input form) is further transformed by use of the registered transform coefficient (the coefficients A, B and D), and the registered form that matches the input form is judged based on the position of the image in the transformation result.

Steps 301 to 307 in FIG. 11 are the same process as steps 201 to 207 in FIG. 8, and therefore, detailed description thereof is omitted here.

According to the comparison in step 305, if there is no match between the forms (No in step 306), the judging section 54 transforms the transformed input form, which is an input form having been transformed by the transform coefficient X (the coefficient X), by use of a transform coefficient of a predetermined registered form M (M is a general formula) stored in the transformation information memory 40 (step 308). If the positions of the images match each other (Yes in step 309), the result output section 55 outputs identifying information (ID) of the registered form M (step 310), and the judging process is finished. In a case where the positions of the images are deviated and do not match each other (No in step 309), it is determined whether the comparison has been carried out with all of the registered forms (step 311), and in a case where the comparison has been carried out with all of the registered forms (Yes in step 311), the result output section 55 outputs "No matching registered form" (step 312), and the judging process is finished. In a case where the comparison with all of the registered forms has not been finished (No in step 311), the process returns to step 308 to carry out the comparison process.

Figure 12:
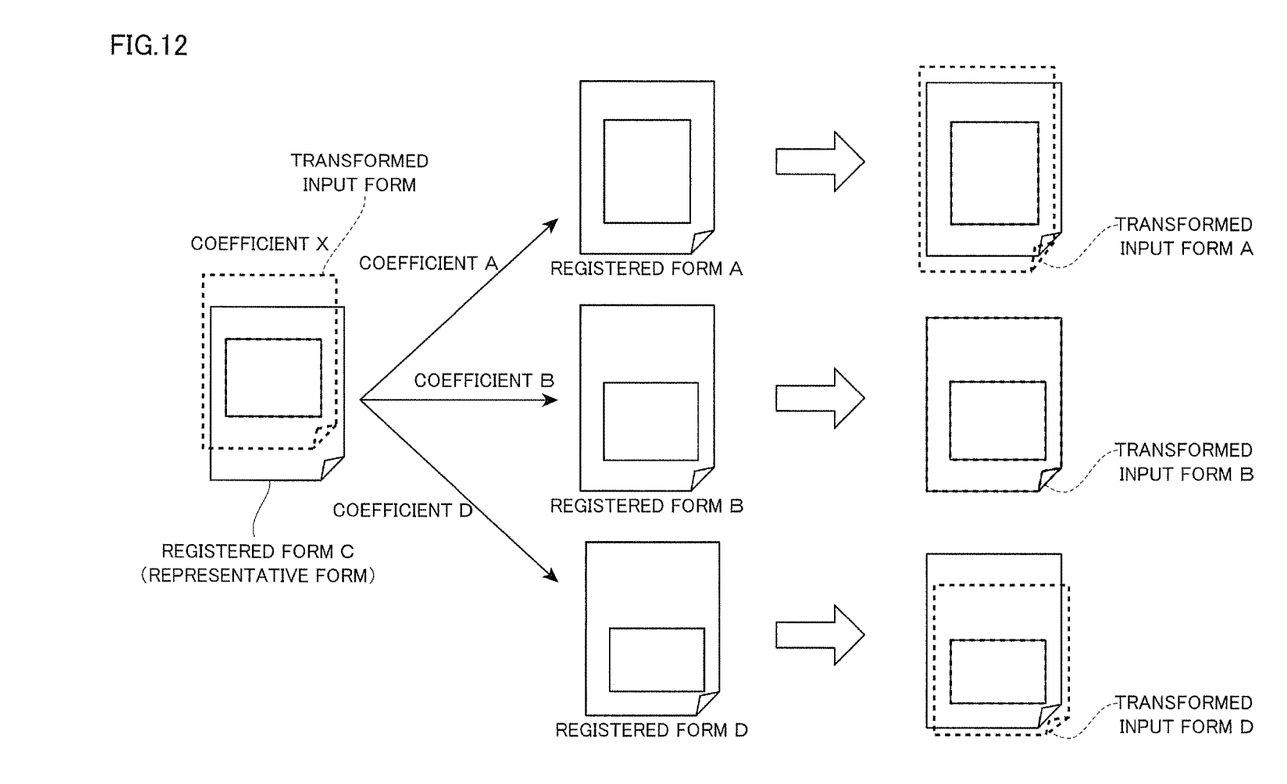
FIG. 12 is a diagram for illustrating a judging process in steps 308 to 312 in FIG. 11.

FIG. 12 is a diagram for illustrating a judging process in steps 308 to 312 in FIG. 11.

In FIG. 12, there is shown a transformed input form A, which is obtained by transforming an input form by the transform coefficient X (the coefficient X) and then transforming the transformed input form by the transform coefficient of the registered form A (the coefficient A). Moreover, there is also shown a transformed input form B, which is obtained by transforming an input form by the transform coefficient X (the coefficient X) and then transforming the transformed input form by the transform coefficient of the registered form B (the coefficient B). Similarly, there is further shown a transformed input form D, which is obtained by transforming an input form by the transform coefficient X (the coefficient X) and then transforming the transformed input form by the transform coefficient of the registered form D (the coefficient D). The positions of the images between the registered form A and the transformed input form A and the positions of the images between the registered form D and the transformed input form D are deviated from each other; and therefore, it is judged that there is no match between the registered form A and the transformed input form A, and between the registered form D and the transformed input form D. On the other hand, since the positions of the images between the registered form B and the transformed input form B match each other, it is judged that the input form is the registered form B.

Note that, in the operation of transforming the input form after transformation by use of the registered transform coefficient, it is also possible to carry out transformation by the transform coefficients of the registered forms in descending order according to the occurrence frequency, to be judged. In this case, the judging speed of a form of high occurrence frequency is increased.

As described in detail above, in the exemplary embodiment, in the situation where the plural forms are registered, a completed form, which is a registered form something is written thereon, is inputted into the system to determine which registered form corresponds to the completed form. In general, in the case where it is determined which registered form corresponds to a form inputted to a DB on which plural forms are registered, for example, it is necessary to extract characteristic amount from the input image, check the characteristic amount against the characteristic amount of the registered image, perform alignment of the input image with the registered image, and calculate a transform coefficient between two pixels. Since it is required to carry out this process on all of the N registered images, it takes a processing time. In the exemplary embodiment, it is possible to save time required for the checking process of the characteristic amount, or time required for the aligning process.

In the exemplary embodiment, relative relationships among the registered forms are calculated and stored in advance, and thereby characteristic amount checking process on all of the registered forms every time the judgment is performed can be avoided, and increase of the processing speed is sought. Moreover, judgment of forms is carried out by the aligning process to save the aligning process after the judgment, and increase of the processing speed is sought. As a method of using a general form determination system, after form judgment is carried out, data such as hand-written characters is extracted from the form. At this time, it is necessary to perform alignment after the form judgment is carried out; however, in the exemplary embodiment, the calculation coefficient for alignment has already been calculated, and increase of the processing speed is sought in performing judgment.

Note that the processes in the above-described exemplary embodiment can be provided as a program implemented on the form processing device 10, which is a computer. The program is, for example, stored in the ROM 13, developed onto the RAM 12, which is a working memory, and executed in the CPU 11.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. A processing device comprising:
 a memory that stores first difference information representing a difference between a judgment use frame in reference information and a representative frame in association with the reference information; and
 at least one hardware processor configured to judge, based on second difference information representing a difference between a judgment frame in input information and the representative frame and on the first difference information stored in the memory, the input information by use of the reference information,
 wherein at least one of the first difference information and the second difference information comprises transform coefficients of a coordinate transformation,
 wherein the at least one hardware processor is further configured to determine whether the input information matches a first registered form by comparing a transformed judgement frame to the representative frame, and
 wherein the transformed judgement frame comprises the judgement frame transformed by a first transform coefficient of the representative frame.

2. The processing device according to claim 1, wherein the first difference information and the second difference information comprise the transform coefficients of the coordinate transformation, and
 the at least one hardware processor is further configured to judge the input information based on a difference between the transform coefficients.

3. The processing device according to claim 1, wherein the at least one hardware processor is further configured to perform at least one of transformation of the input information by use of the second difference information and transformation of transformed input information, which is the input information transformed by use of the second difference information, by use of the first difference information, and to judge the input information by use of the information after transformation.

4. A processing device comprising:
 at least one hardware processor configured to implement:
 detecting a judgment use frame in input information from each of a plurality of registered forms serving as references;
 determining a representative frame by use of each of the detected judgment use frames;
 calculating each difference information between the determined representative frame and each of the judgment use frames;
 storing the each calculated difference information in association with each corresponding registered form; and
 determining whether the input information matches a first registered form by comparing a transformed judgement frame to the representative frame, and
 wherein the transformed judgement frame comprises the judgement frame transformed by a first transform coefficient of the representative frame.

5. The processing device according to claim 4, wherein the at least one hardware processor is further configured to implement a largest frame as the judgment use frame from each of the plurality of registered forms.

6. The processing device according to claim 4, wherein, the at least one hardware processor is further configured, in a case where there are registered forms including the detected judgment use frames having substantially the same size and position, to detect the judgment use frame by use of a second frame and a third frame from each of the registered forms.

7. The processing device according to claim 4, wherein the at least one hardware processor is further configured to determine substantially a mid-sized judgment use frame as the representative frame among the judgment use frames.

8. The processing device according to claim 4, wherein the at least one hardware processor is further configured to:
  detect frames in the registered forms in descending order according to size as the judgment use frames,
  determine the representative frame per each frame size, and
  calculate the difference information per each frame size.

9. A processing device comprising:
at least one hardware processor configured to implement:
  obtaining a completed input form;
  detecting a judgment frame from the obtained completed input form;
  calculating input form difference information, which is difference information between the detected judgment frame and a predetermined representative frame;
  obtaining, from a memory in which each difference information between a judgment frame of each of a plurality of kinds of registered forms serving as references and the representative frame is stored, the difference information;
  judging an input form based on the input form difference information and the difference information, and
  comparing a transformed input form, which is obtained by transforming the input form by use of the input form difference information, with a representative form including the representative frame, and to judge whether or not the input form matches the representative form.

10. The processing device according to claim 9, wherein the memory stores the each difference information in association with each corresponding registered form, and
the at least one hardware processor is further configured to transform the transformed input form, which is obtained by transforming the input form by use of the input form difference information, by use of the difference information stored in the memory, to compare the transformed input form transformed by use of the difference information with the registered form corresponding to the difference information, and to judge the input form based on deviation between image positions of the forms.

11. A processing method comprising:
storing first difference information representing a difference between a judgment use frame in reference information and a representative frame in association with the reference information;
based on second difference information representing a difference between a judgment frame in input information and the representative frame and on the first difference information having been stored, judging the input information by use of the reference information; and
determining whether the input information matches a first registered form by comparing a transformed judgement frame to the representative frame,
wherein at least one of the first difference information and the second difference information comprises transform coefficients of coordinate transformation, and
wherein the transformed judgement frame comprises the judgement frame transformed by a first transform coefficient of the representative frame.

12. The processing device according to claim 1, wherein in a case in which the at least one hardware processor is further configured to determine that the input information does not match the first registered form, the at least one hardware processor is further configured to transform the transformed judgement frame, by a second transform coefficient of another judgement use frame, into a further transformed judgement frame, and to judge whether the input information matches a second registered form by comparing the further transformed judgement frame to the another judgement use frame, and
  wherein the second transform coefficient comprises values which when applied to the representative frame, transform the representative frame into the another judgement use frame.

13. The processing device according to claim 1, wherein the at least one hardware processor is further configured to transform the transformed judgement frame a plurality of times, by respective ones of a plurality of second transform coefficients respective to a plurality of other judgement use frames, into a plurality of further transformed judgement frames, and to judge whether the input information matches any of a plurality of second registered forms by comparing the plurality of further transformed judgement frames to the plurality of other judgement use frames,
  wherein the plurality of second transform coefficients comprise values which when applied to the representative frame, transform the representative frame into ones of the plurality of other judgement use frames, and
  wherein the at least one hardware processor is further configured to determine a match between the input information and any one of the plurality of second registered forms by determining that a corresponding one of the plurality of further transformed judgement frames more closely matches a corresponding one of the plurality of other judgement use frames than other ones of the plurality of other judgement use frames,
  wherein the corresponding one of the plurality of other judgement use frames comprises one of the second transform coefficients by which the transformed judgement frame is transformed to the corresponding one of the plurality of further transformed judgement frames.

14. The processing device according to claim 13, wherein the one of the second transform coefficients comprises coefficients which, when applied to the representative frame, transforms the representative frame into the corresponding one of the plurality of other judgement use frames.

* * * * *